United States Patent [19]

Stankus

[11] 3,892,922

[45] July 1, 1975

[54] TELEPHONE CONTROL SYSTEM

[75] Inventor: Robert W. Stankus, Fairfield, Conn.

[73] Assignee: Letot, Incorporated, Fairfield, Conn.

[22] Filed: May 18, 1973

[21] Appl. No.: 361,653

[52] U.S. Cl. .................. 179/2 A; 179/2 R

[51] Int. Cl. .................. H04m 11/02

[58] Field of Search .......... 179/2 R, 2, 19, 18 FA, 179/27

[56] References Cited

UNITED STATES PATENTS

| | | | |
|---|---|---|---|
| 2,663,763 | 12/1953 | Schmitz et al. | 179/27 |
| 3,582,557 | 6/1971 | Friberg et al. | 179/2 |
| 3,614,325 | 10/1971 | Galian et al. | 179/2 R |
| 3,699,265 | 10/1972 | Altenburger | 179/19 |

*Primary Examiner*—Kathleen H. Claffy
*Assistant Examiner*—Tommy P. Chin
*Attorney, Agent, or Firm*—Pennnie & Edmonds

[57] ABSTRACT

Telephone control system for use with a telephone having a manually operated switch which is connected to a telephone substation where the system has room status indicating means, means for disconnecting the telephone from the substation and connecting it to the control system, means for changing the indicating means responsive to movement of the manually operated telephone switch, and time delay means to delay response of change of the indicating means upon movement of the manually operated switch.

2 Claims, 1 Drawing Figure

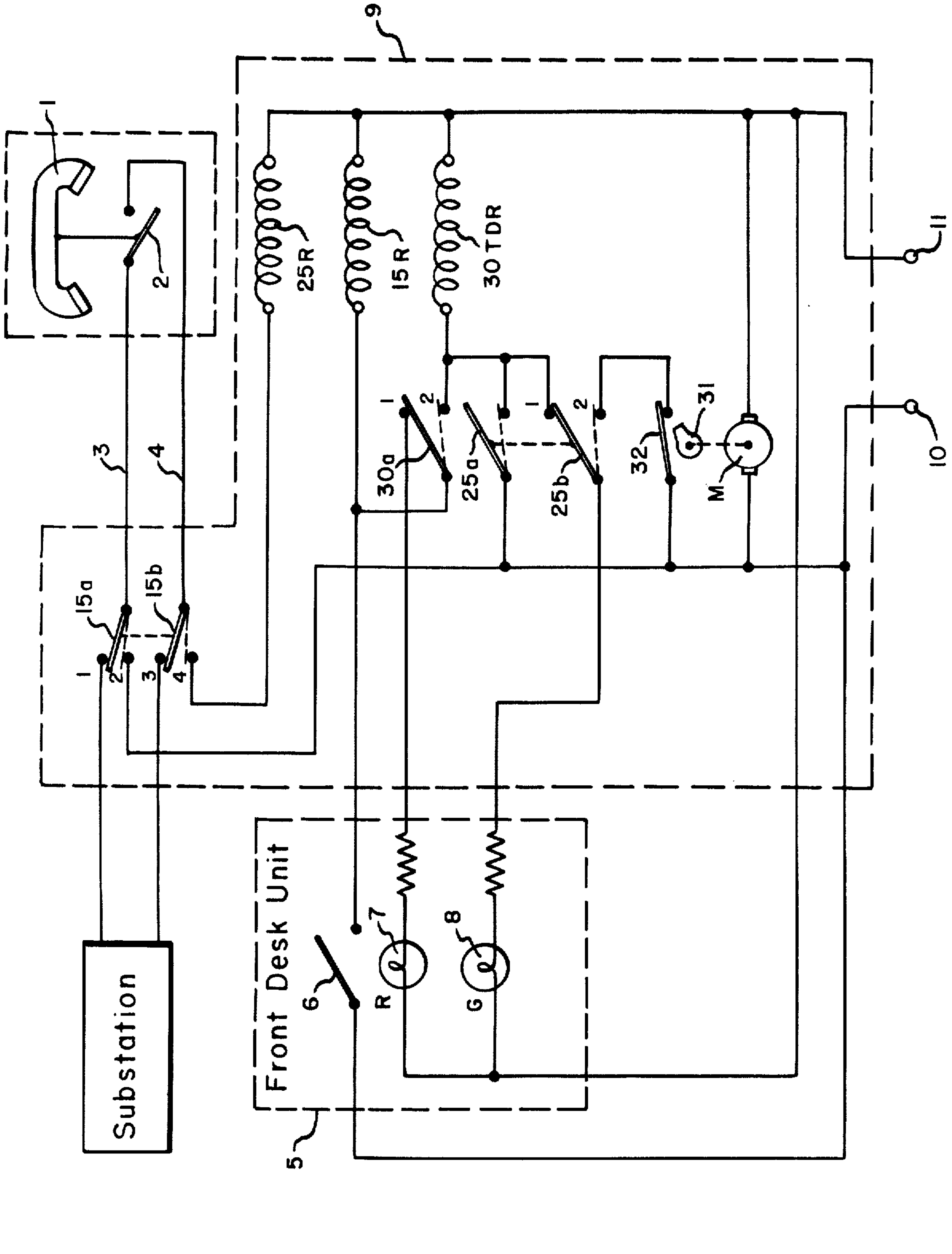
Substation
Front Desk Unit
25R
15R
30TDR
30a
25a
25b
15a
15b
M
R
G

TELEPHONE CONTROL SYSTEM

DESCRIPTION OF THE PRIOR ART

Telephone systems are known which include indicating means located at a check-in or check-out counter by which the status of a room in a hotel or motel may be easily ascertained. Such systems include circuitry by which the telephone in a room may be disconnected from a telephone substation and connected to a room status system upon actuation of a control switch by a room clerk. Further circuitry is included such that a maid upon entering a room may lift a telephone receiver from its cradle and transmit a signal to the indicating means to indicate that she is in a room and cleaning it. Upon completion of cleaning, the maid replaces the receiver on its cradle transmitting a further signal to the indicating means to indicate that the room has been cleaned and is ready for rental. At such time the desk clerk may move the control switch, i.e., when the room is rented, to disconnect the room telephone from the status system and reconnect it to the telephone substation. Such a system is disclosed in U.S. Pat. No. 3,614,325.

Systems as disclosed in that patent can, however, be manipulated by a guest to send false signals to an indicating means at a front desk unit indicating that the maid is in a room and that it has been cleaned. Such a situation arises when a guest checks out and the desk or check-out clerk actuates the control switch to disconnect the telephone from the substation and connect it to the status system and to indicate that the vacated room needs cleaning. If the guest then returns to his room before it has been cleaned, as for example to pick up the remainder of his luggage or forgotten articles, and the guest attempts to use the telephone, the same signals will be sent to the room status system as if a maid were in the room. Specifically when the guest lifts the receiver, a signal will be transmitted to the front desk that a maid is in a room, and when he replaces the receiver a signal would be sent to indicate that the room is cleaned and ready for re-rental when in fact it is not. Further, if the room clerk receives a signal that a room has been cleaned and disconnects the status system from the telephone and reconnects the telephone to the substation, the guest will then be in a position to make telephone calls for which he may not be charged in the event he has already checked out.

It is therefore an object of my invention to provide a means which will deter false signals being sent to a room status system by a guest attempting to use a telephone after he has checked out to indicate that a room is in the process of being cleaned or has been cleaned and is ready for occupancy.

GENERAL DESCRIPTION OF THE INVENTION

Broadly, my invention comprises incorporating a time delay mechanism into a room status system by which the transmission of any signals occasioned by lifting a telephone receiver from its cradle after the telephone in the room has been connected to a room status system will be subjected to a predetermined delay. After a telephone is disconnected from the telephone substation by actuation of a control switch by a check-out or room desk clerk and connected to a room status system, the user of the telephone will receive no signal or dial tone. If the delay is in the order of 60 seconds, the would-be-user of the telephone will in all probability replace the receiver on the cradle before any signal is sent to the status system. On the other hand a maid upon entering the room will lift the receiver from its cradle and since her job will require more than 60 seconds, a signal will be sent to the status system at the end of 60 seconds or other predetermined time that the maid is in a room performing her cleaning functions, and when she is finished, replacement of the receiver on the cradle will indicate that the room has been cleaned and is ready for occupancy.

DESCRIPTION OF THE DRAWING

The drawing is a diagrammatical circuit diagram of a telephone control system constructed according to the invention.

DETAILED DESCRIPTION OF THE EMBODIMENT

As shown, the telephone control system of the invention is adapted for use with a conventional telephone 1 having a manually operated switch 2 which is connected to a conventional telephone substation by means of telephone wires 3 and 4. The system includes a front desk unit 5 which has thereon an actuation control switch 6 and an indicating means including a red light 7 and a green light 8.

The control system also includes a panel unit 9 which may be conveniently located near the substation or front desk unit and which includes connections 10 and 11 to a power source. A relay coil 15R is included to operate switches 15*a* and 15*b* which, when the relay coil 15R is in its deenergized state serves to connect the telephone wires 3 and 4 to the substation by contact 1 of switch 15*a* and contact 3 of switch 15*b*. Relay coil 15R is energized by closing the control switch 6 so that a circuit is completed through contact 10, switch 6, relay coil 15R and contact 11. This will cause switches 15*a* and 15*b* to move from their full line position to their dotted position to make contact with their contacts 2 and 4 thus disconnecting the telephone wires from the substation and connecting them to the control system. At the same time that switch 6 is closed, a circuit is completed from the contact 10 through switch 6, switch 30*a*, through the red light 7 and contact 11 thus energizing the red light to indicate that a room is vacant and in need of cleaning.

A maid upon entering a room will lift the telephone receiver 1 such that the manually operated switch 2 closes whereby a circuit is completed through the contact 10, contact 2 of switch 15*a*, switch 2, contact 4 of switch 15*b*, relay coil 25R and contact 11.

Energization of relay coil 25R in turn will cause the switches 25*a* and 25*b* to move to their dotted line position. This will provide a circuit from contact 10 through switch 32, switch 25*b*, green light 8 and contact 11. A motor M which drives a cam 31 is contained within a circuit between contacts 10 and 11 and rotates continuously. Cam 31 in turn periodically opens switch 32 thus causing the green light to flash to indicate that the receiver is off its cradle.

While switch 2 is closed, a circuit is also completed through contact 11, relay coil 30TDR, switch 25*a*, and contact 10. Energization of relay coil 30TDR moves switch 30*a* to its dotted line position to provide a holding circuit for the relay 30TDR through switch 6 and contact 10. At the same time the red light 7 is deenergized. The relay 30TDR, as more fully explained hereafter, is a time delay relay.

When the maid has cleaned a room, she replaces the receiver 1 on its cradle thus opening switch 2. This in turn will deenergize relay coil 25R causing switches 25*a* and 25*b* to assume their full line position. This will complete a circuit between contact 11, green light 8, switch 25*b* and its contact 1, switch 30*a* and its contact 2, switch 6 and contact 10 such that the green light will burn steadily. This will then indicate that a room has been cleaned and is ready to be re-rented.

The room clerk on renting the room will open switch 6 thus deenergizing the green light 8. At the same time relay coil 15R will deenergize allowing switches 15*a* and 15*b* to return to their full line position and connect the telephone wires to the substation.

Relay coil 30TDR includes a time delay feature in order to prevent a guest who may re-enter his room after check out from triggering false signals to the indicating means at the front desk by any attempt to use the telephone. The checkout clerk on check-out of a guest will close switch 6 to energize the red light 7 to indicate that a room is in need of cleaning. As explained previously, this will disconnect the telephone wires from the substation and connect them to the status system. A guest then attempting to use the telephone will not receive any dial tone upon lifting the receiver and normally after a short wait, usually much less than a minute, will replace the receiver on its cradle. If no time delay feature were included in relay 30TDR, switch 30*a* would move at the same time the switch 2 was closed extinguishing the red light and providing a circuit for the continued operation of the green light when the receiver was replaced on its cradle. Incorporation of a 60-second time delay prevents the immediate movement of switch 30*a* and results in the red light remaining on for the period of time delay. When the guest replaces the receiver back on its cradle before the 60-second period is up, no movement of switch 30*a* occurs and the red light remains on indicating that the room is in need of cleaning. However, a maid on entering a room may be expected to stay more than 60 seconds. Sixty seconds after she removes the receiver from its cradle, relay 30TDR will then operate moving switch 30*a* and extinguishing the red light.

While I have described my system with reference to only one telephone, this system may be used with a number of telephones and indicating means as illustrated in U.S. Pat. No. 3,614,325. In such event each room would have its own control system in the manner shown in the drawing. It is further apparent that additional indicating means could be used situated in other locations than the front desk, for example, a housekeeping station in order that a housekeeper might be informed by the red light when a room needed service so that she could dispatch a maid to that room.

I claim:

1. A telephone control system for use with a telephone having a manually operated switch with opened and closed positions and connected to a telephone substation by telephone wires, said system having:

A. a desk unit having an actuation switch and indicating means for indicating status of a room, B. power means adapted to energize said indicating means, and C. circuit means including:

1. means responsive to actuation of said actuation switch for disconnecting said telephone wires from said substation and connecting said wires to said indicating means, and
2. means responsive to closing of said manually operated switch for changing energization of said indicating means;

the improvement comprising having a time delay means in said circuit means for delaying operation of said means responsive to closing of said manually operated switch when said telephone wires are connected to said indicating means thereby delaying changing of energization of said indicating means when said manually operated switch is closed.

2. A room status system for use with a telephone located in a room where the telephone is connected to a telephone substation by telephone wires and where the telephone has a manually operated switch having opened and closed positions, said room status system comprising:

A. actuation switch means for actuating said status system,

B. indicating means,

C. means for providing energization to the indicating means, and

D. circuit means including:

1. first means responsive to the actuation of said actuation switch means for disconnecting said telephone wires from said substation and connecting said wires to said status system, and
2. second means responsive to closing of said manually operated switch while said wires are connected to said status system for changing energization of said indicating means;

the improvement comprising having a time delay means associated with said second means for delaying changing of energization of said indicating means upon closing of the manually operated switch.

* * * * *